UNITED STATES PATENT OFFICE.

JOHN J. FAHEY, OF LYNN, MASSACHUSETTS.

CORE AND MOLD FOR METAL CASTINGS AND METHOD OF MAKING THE SAME.

1,315,293.      Specification of Letters Patent.      Patented Sept. 9, 1919.

No Drawing.      Application filed December 6, 1918. Serial No. 265,636.

*To all whom it may concern:*

Be it known that I, JOHN J. FAHEY, a citizen of the United States, residing at Lynn, in the county of Essex and State of Massachusetts, have invented new and useful Improvements in Cores and Molds for Metal Castings and Methods of Making the Same, of which the following is a specification.

This invention relates to the art of metal founding. Its object is to produce cores adapted to form the interior parts of hollow metal castings, and molds of similar nature for like purposes, which are completed and made ready to serve their intended use without being baked. A secondary object is to make cores and molds of this nature, which, while being sufficiently hard, strong, and tenacious prior to use to serve the purpose for which they are made, yet become after subjection to the intense heat of the molten metal so fragile and brittle that they crumble easily and may thus be conveniently removed from the interior parts of the completed castings.

Cores and molds of the type above referred to are made by mixing a granular or pulverulent body material, such as sand or clay, with a fluid binder, of which many types are available in the market, into a plastic mass, shaping masses of the plastic mixture to the required forms, and baking such formed masses for a long enough time to make them hard and permanent. So far as I am aware all methods of making cores and molds of this sort used up to the present time involve the step of baking the plastic mixture composed of granular body material and a binding composition, and all of the binding compositions for this purpose require to be baked in order to become hard and permanent. This baking operation of course requires suitable equipment in the form of baking ovens; in other words, it requires a permanent investment of money in plant and a constant expenditure of money for the purchase of fuel. The cores so produced generally remain hard after use, and in most cases can only be removed from the interior parts of the castings in the making of which they are used by being chipped out with the use of tools and expenditure of labor or power.

I have invented a binding composition which is adapted to be mixed with any of the sands, clays, or earths used as the body material for making cores or molds, which becomes hard and firm upon drying in the open air without exposure to baking heat, which loses its cohesion and disintegrates when subjected to the intense heat of molten metal, and from the combination of which with such body material satisfactory cores and molds may be made without use of the baking process. The invention for which I claim protection herein consists in the process of making cores and molds of the type herein set forth, without baking and with employment of said composition, and in the cores and molds resulting from such process, with the underlying principles and all equivalents of such process, and product having the characteristics substantially as pointed out in the claims appended to this specification.

I do not claim herein the binding composition *per se* as that forms the subject of a continuing application containing matter originally claimed in the present application.

In my references in this specification to body material, I intend to indicate and include any and all sands, clays, earths and other substances which have been or may be used for making metal founding molds and cores. My invention is not concerned with any new body material, but with the combination of a new binding composition with any new or old body material and the process of making cores and molds from such combination of materials, and the product of such process. The binding composition consists essentially of a resinous gum and a solvent adapted to be absorbed by evaporation into the atmosphere, with which is preferably combined an inert filler. The precise nature of that form of the composition which I have found satisfactory and desirable on account of its efficiency of action and low cost consists of the following ingredients in substantially the proportions indicated beside the names of the several ingredients.

| | |
|---|---|
| Manila chips | 10 % |
| Rosin | 10 % |
| Linseed oil | 1 % |
| Alcohol | 34 % |
| Naphtha or benzol | 10 % |
| Bolted clay | 25 % |
| Plaster of Paris | 9.5% |
| Sugar of lead | .5% |

The proportions of all of these ingredients may be varied within more or less wide limits, and this is particularly true as to the solvents (alcohol and naphtha or benzol). The proportion of alcohol in the entire composition may be as low as 15%; and as high as 50%; and that of naphtha or benzol as low as 5% or as high as 30%. These particular solvents are chosen rather than others for reasons of necessity and cost. Naphtha which is lower in cost than alcohol is used as far as possible, and alcohol is used for dissolving the Manila chips (copal) since naphtha is incapable of dissolving this substance. An excess of either solvent above the maximum proportions indicated merely increases the fluidity, and has no detrimental effect other than resulting in unnecessary expenditure of the solvent and therefore waste. The proportions of Manila chips or copal chips may be as low as 5% or as high as 30%, and the same is true as to the rosin, which may vary within the same limits. The bolted clay and plaster of Paris constituents are provided in order to extend the composition, that is, increase the bulk of it and facilitate its admixture with the sand or other body material. Plaster of Paris also has the effect of making the finished article more hard and rigid after drying and setting than would be the case if it were omitted; but either or both of the clay and plaster of Paris ingredients may be omitted, or supplied in greater or less ratios than those above given. The preferable relative content of these ingredients is that which gives sufficient bulk to the composition without reducing the adhesive quality of the gum below the required degree. Linseed oil, which is an oxidizable vegetable oil, is used in the preferred composition to give a certain degree of resilience and toughness to the product, modifying the brittle character of the resinous gum, and sugar of lead is provided for its effect in hastening the oxidization of the oil; but these ingredients, which are provided in relatively very small ratios, although not necessarily as small as stated in the foregoing recipe, may be diminished or omitted altogether without destroying the utility of the composition; or other drying oils may be substituted for linseed oil.

In compounding the binding composition, the Manila chips or copal chips and rosin constitutents are separately dissolved in the solvents, and the resulting solutions are mixed together, after which the other ingredients are added in the amounts desired in any convenient order. The compounding may be carried out at the laboratory room temperature, that is, without artificial heat. In the resulting composition the clay and plaster of Paris ingredients, being finely ground in the first place, remain in suspension, giving the composition a pasty consistency of greater or less fluidity according to the quantities used of these ingredients. This composition may be produced at a manufacturing laboratory and shipped to the place of use, or sold to users, in any containers sufficiently impervious to prevent rapid evaporation of the solvent.

In making cores or molds for giving desired forms to metal castings, the binding composition having the characteristics hereinbefore defined is mixed with powdered or granular material of the character previously defined in various ratios from 1/15 to 1/60 according to the character of the casting to be made and the metal to be cast. Then, after forming the core or mold to the desired pattern, it is allowed to dry in the air from one to five hours, more or less, depending on the temperature and absorptive capacity of the surrounding air. When so dried the core or mold is tenacious and rigid and not sticky. In other words it is hard, dry, and non-fragile and is therefore capable of being handled without great care and adapted to withstand the weight and pressure of the molten metal which flows into or around it in the founding process. The article so made retains this condition permanently until used, even though considerable time should elapse between its manufacture and use. Being made mainly of materials which are insoluble in water, such an article is not affected by moisture. It is, however, made porous by evaporation of the solvent to such degree that it will permit free passage of gases generated by the effects of heat from the molten metal upon the gum constituent of the binder to the vents with which metal founding flasks and molds are provided, and blow holes will not be made by such gases in the casting.

By virtue of the foregoing characteristics, cores and molds produced by this invention are useful for all purposes for which cores and molds previously made are adapted, while the invention results in the conspicuous advantage that such articles may be finished by air drying simply and without baking, thus doing away with the investment in plant and expenditure for fuel heretofore necessary. A further advantage results from the fact that after being subjected to the heat of molten metal in the manner and for the length of time to which a core or mold is subjected in its ordinary mode of use, the binding material, which was previously firm and hard, loses its cohesion and no longer binds the particles of the body material together, wherefore the core or mold becomes fragile and crumbles easily, and may be removed from the interior parts of a finished casting with the greatest ease. Baked molds and cores as heretofore constituted are generally so hard after cooling of the casting as to be removable from interior parts of the casting only by expenditure of energy in chipping with the use of tools. The castings also come from the mold with better finish than is given by the baked cores and molds previously used. The surfaces of the castings are smoother and without the roughness and irregularity which characterizes the cored surfaces of metal castings as heretofore made. This improved result is particularly marked in the case of phosphor-bronze castings the founding heat of which is excessively high, and of which therefore the destructive effect on molds and cores is very great.

Inasmuch as the hereinbefore described method of making cores and molds, the article resulting from the practice of such method, and the binder having the characteristics herein pointed out and used in the practice of the method and in the composition of the resulting product, are all related subject matters of invention, I claim them all in the present application. I would state further in explanation of my claim to the binding composition, that under the term "resinous gum", I include not only the specific gums hereinbefore named, that is, Manila chips or copal, and rosin, but also all other gums now known, or which may be subsequently discovered, to have equivalent properties to those above described in such a composition; and with regard to the solvents, I may use any other fluids which are capable of dissolving such gums and are also sufficiently volatile to escape as vapor from the composition into the air. The term "alcohol" may be construed in this specification and the following claims as generic and including all alcohols, ethers, ketones, etc., which may be adapted for the purpose; while "naphtha" and "benzol" typify volatile hydrocarbons of different origins and well understood characteristics, and are to be understood as including all volatile solvents of similar nature and equivalent properties for the purposes herein set forth. The term "fluid" as used in the following claims is not restricted as to degree of fluidity, but includes the combination specified in any condition of fluidity or plasticity which enables it to be mixed in the desired way with the body material as set forth.

What I claim and desire to secure by Letters Patent is:

1. The method of making molds and cores for metal founding which consists in mixing body material with a fluid binder and air drying the construction made therefrom.

2. The method of making molds or cores for metal founding which consists in mixing body material with a fluid binder containing a volatile solvent and having the property of becoming hard upon evaporation of such solvent, and then air drying the article made from such mixture.

3. The method of making cores or molds for use in metal founding which consists in mixing body material with a binder containing a tenacious normally solid substance in solution with a volatile solvent, shaping the mixture to the required form or pattern, and air drying the article so produced whereby the solvent is caused to escape and the molded article is rendered hard, strong, and porous.

4. The method of making cores and molds for metal founding which consists in mixing granular body material with a binder containing a resinous gum and a volatile solvent in solution, shaping the mixture to the desired form or pattern, and drying the same in the open air at ordinary temperatures until the solvent has escaped to the extent that the remaining body is hard, dry, and non-adhesive.

5. The method of making cores and molds for metal founding which consists in mixing granular body material with a binder which contains a resinous gum dissolved in a volatile solvent and a mass of powdered inert mineral material, shaping the mixture to the desired form or pattern, and drying the same at ordinary atmospheric temperatures.

6. The method of producing cores or molds for metal founding which consists in mixing from fifteen to sixty parts of granular body material with one part of a fluid binding composition including a volatile solvent, a resinous gum in solution with such solvent, and inert powdered mineral matter in suspension, forming the mixture into the desired form or pattern, and drying the resultant article by exposure to the air at ordinary temperatures, whereby such article becomes hard, tenacious, porous, and non-absorptive of moisture.

7. The method of producing cores or molds for metal founding which consists in mixing granular body material with a binder which includes a fluid solution of copal gum in alcohol, shaping the mixture to the desired form, and drying the same at moderate temperature.

8. The method of producing cores or molds for metal founding which consists in mixing granular body material with a binding composition containing a fluid solution of rosin and naphtha, giving the mixture a desired form, and then drying the article so formed at moderate temperature.

9. The method of producing cores or molds in metal founding which consists in mixing granular body material with a fluid binding composition containing copal and rosin dissolved in alcohol and naphtha mingled with an inert mineral powder, forming the mixture into desired form, and drying the resultant formed article at ordinary temperatures.

10. A core or mold for use in metal founding, being hard and tenacious, and adapted to be made fragile by subjection to the heat of molten metal.

11. A core or mold for use in metal founding resulting from drying a mixture of body material with a binder consisting of a resinous gum and a solvent in solution, such core or mold being hard, strong, tenacious, porus and non-absorptive of moisture.

12. A core or mold for use in metal founding consisting of a dried mixture of body material with a resinous gum.

13. A core or mold for use in metal founding consisting of a dried mixture of body material with copal gum.

14. A core or mold for use in metal founding consisting of a dried mixture of body material with rosin.

15. A core or mold for use in metal founding consisting of granular body material and binding means securing said particles together in a mass, said binding means consisting substantially of a dry and firm resinous gum having cohesion and being destructible by high heat.

In testimony whereof I have affixed my signature.

JOHN J. FAHEY.